(12) United States Patent
Roberts et al.

(10) Patent No.: US 6,994,078 B2
(45) Date of Patent: Feb. 7, 2006

(54) APPARATUS FOR REMOVING CONTAMINANTS FROM CRANKCASE EMISSIONS

(75) Inventors: Richard D. Roberts, Grafton, OH (US); James R. Brock, Grass Valley, CA (US); Edmund Loughran, Lincoln, CA (US)

(73) Assignee: New Condensator, Inc., Minden, NV (US)

( * ) Notice: Subject to any disclaimer, the term of this patent is extended or adjusted under 35 U.S.C. 154(b) by 0 days.

(21) Appl. No.: 11/044,485

(22) Filed: Jan. 27, 2005

(65) Prior Publication Data

US 2005/0161030 A1 Jul. 28, 2005

Related U.S. Application Data

(60) Provisional application No. 60/539,654, filed on Jan. 28, 2004.

(51) Int. Cl.
 *F02B 25/06* (2006.01)
(52) U.S. Cl. ..................................... 123/572
(58) Field of Classification Search ........ 123/572–574; 55/323, 456, 385.3
 See application file for complete search history.

(56) References Cited

U.S. PATENT DOCUMENTS

| | | | |
|---|---|---|---|
| 3,976,448 A | 8/1976 | Eng et al. | |
| 4,089,309 A | 5/1978 | Bush | |
| 4,370,971 A | 2/1983 | Bush | |
| 4,515,137 A | 5/1985 | Manolis | |
| 4,946,483 A * | 8/1990 | Coral | 55/323 |
| 5,024,203 A * | 6/1991 | Hill | 123/573 |
| 5,113,836 A | 5/1992 | Sweeten | |
| 5,239,972 A | 8/1993 | Takeyama et al. | |
| 5,277,154 A | 1/1994 | McDowell | |
| 5,313,926 A | 5/1994 | Lin | |
| 5,417,184 A | 5/1995 | McDowell | |
| 5,450,835 A * | 9/1995 | Wagner | 123/573 |
| 5,460,147 A | 10/1995 | Bohl | |
| 5,494,020 A | 2/1996 | Meng | |
| 5,564,401 A | 10/1996 | Dickson | |
| 5,617,834 A * | 4/1997 | Lohr | 123/572 |
| 5,694,907 A | 12/1997 | Tseng | |
| D393,471 S | 4/1998 | Bush | |
| 5,954,035 A | 9/1999 | Hofer et al. | |
| 6,058,917 A | 5/2000 | Knowles | |
| 6,152,120 A | 11/2000 | Julazadeh | |

(Continued)

*Primary Examiner*—Marguerite McMahon
(74) *Attorney, Agent, or Firm*—Fay, Sharpe, Fagan, Minnich & McKee, LLP

(57) ABSTRACT

A separator for separating liquids in a fluid stream generated by blow-by gases produced in a crankcase of an internal combustion engine wherein the fluid stream includes both gasses and liquids. The separator including an inlet in fluid connection with the engine for receiving the fluid stream and an outlet in fluid connection with the engine to return a gas stream to the engine. The separator further including a fluid path fluidly connecting the inlet to the outlet and a containment vessel in fluid connection with the fluid path. The separator having a fluid stream accelerator in the fluid path and the accelerator accelerating the fluid stream to at least partially separate the gasses from the liquids in the fluid stream. A deflector, which is also in the fluid path between the accelerator and the outlet, changes the direction of the liquid to direct at least part of the liquids in the fluid stream into a containment portion of the vessel and directs the gas stream to the outlet.

20 Claims, 9 Drawing Sheets

U.S. PATENT DOCUMENTS 6,161,529 A    12/2000   Burgess
6,591,820 B2    7/2003   Kitano et al.
2002/0088445 A1    7/2002   Weindorf et al.
2004/0103889 A1 *    6/2004   Akiyama et al. .......... 123/572

* cited by examiner

APPARATUS FOR REMOVING CONTAMINANTS FROM CRANKCASE EMISSIONS

This application claims priority of provisional patent application Ser. No. 60/539,654, filed Jan. 28, 2004.

The present invention relates to a device for removing contaminants from the crankcase emissions produced by an internal combustion engine while in operation and while at idle. More particularly, to a separator for separating the liquids from the vapors in a fluid stream passing from the crankcase of an internal combustion engine. By separating the liquids from the vapors, the vapors can be returned to the intake of the engine to be reintroduced with the fuel-air mixture allowing the vapors to be combusted and causing better combustion while the liquids can be collected for proper disposal. As a result, essentially all of the fluid stream passing from the crankcase is prevented from escaping into the environment.

INCORPORATION BY REFERENCE

The present invention relates to separating the liquids from the vapors in a fluid stream generated by an internal combustion engine so that the vapors or gasses can be burned off by the engine and the fluids can be recovered. The creation of the fluid stream in the crankcase of an internal combustion engine is shown and described in Bush U.S. Pat. No. 4,370,971 and Bush U.S. Pat. No. 4,089,309. The Bush patents show and describe how the "blow-by" gasses are created in the internal combustion engine and the need to control these liquids and vapors produced by the "blow-by" gasses. McDowell U.S. Pat. No. 5,277,154 and Knowles U.S. Pat. No. 6,058,917 also show and describe the creation of "blow-by" gasses in an internal combustion engine and the need for separating the liquids from the gasses.

BACKGROUND OF THE INVENTION

While the present invention is particularly applicable for use in connection with diesel engines and, therefore, much of the description will relate to diesel engines, the present invention has much broader applications in that it can be used in connection with non-diesel engines including gasolene engines and other internal combustion engines. Further, the present invention can be used in connection with virtually all internal combustion engines regardless of how the engine is used. In this respect, while due to Federal regulations the present invention is particularly applicable for use with vehicle engines, the invention can be used in connection with other internal combustion engine applications including but not limited to construction equipment and generators.

It is, of course, well known that fluids or liquids and gasses or vapors can pass from the combustion chambers of an internal combustion engine under a misfire or a lost energy situation and enter the crankcase of the engine. This can occur during both the compression of the fuel-air mixture and during the combustion of the fuel-air mixture. In this respect, during the compression stroke of the piston, a portion of the fuel-air mixture can bypass the piston rings and enter the crankcase. In similar fashion, during the exhaust cycle, exhaust gases can also bypass the piston rings and enter the crankcase. The crankcase houses the majority of the engine oil reserve. These gasses are referred to as "blow-by" gasses and they mix with the engine oil in the crankcase due to the high speed churning action of the crankshaft and connecting rods. Further, the high turbulence created by the turning crankshaft and connecting rods creates pressure. This pressure within the crankcase must be relieved or the engine will self-destruct. However, relieving or balancing this pressure requires a fluid flow of all the unburned and exhaust gasses to exit the crankcase. The gasses exiting the crankcase of the engine are under pressure which creates a drafting affect that draws engine oil up and out the crankcase. In addition, the churning action discussed above also mixes the engine oil with the gasses in the fluid flow exiting the crankcase. As a result, the fluid flow flowing out of the crankcase includes a substantial amount of engine oil.

In some engines, the fluid flow is allowed to exit the engine by way of a "blow-by tube" wherein the fluid flow is passed directly into the environment. This mixture includes heavy pollutants and most all diesel engines operate today with an open "blow-by tube" allowing this fluid flow to escape directly into the environment.

In order to minimize the environmental impact and to meet stricter governmental regulations, positive crankcase ventilation (PCV) systems have been developed which recycle these "blow-by" gasses back into the induction system of the engine. As a result, at least a portion of the "blow-by" fluids is burned during the combustion of the fuel-air mixture. However, while the PCV system reduces the environmental impact of the fluid flow from the crankcase, it does not prevent all pollutants from escaping to the environment and it has adverse effects on the engine itself. In this respect, reintroducing the "blow-by" material into the engine, by way of the induction system, reduces the performance of the engine, creates unwanted deposits on the working components of the engine thereby reducing the life of the engine and has an adverse effect on the emission control system of the vehicle. The burning of all "blow-by" material can also limit the types of emission systems that can be used on the vehicle. And even further, these existing PCV systems do not function with diesel engines.

SUMMARY OF THE INVENTION

In accordance with the present invention, provided is a separator that separates the liquids from the gasses and/or vapors in a fluid stream produced by the "blow-by" gasses generated in an internal combustion engine. With this separator, a substantial portion of the fluids in the "blow-by" fluid stream is separated and collected. Only the lighter hydrocarbons are directed back into the intake of the engine and reintroduce with the fuel-air mixture. By reducing the liquids that are reintroduced into the induction system of the engine, engine performance is improved. As stated above, much of the liquid in the fluid stream is contaminated crankcase oil which is not designed to be burned during combustion. In addition, reducing the reintroduced liquids reduces unwanted engine deposits and can increase engine life. Further, improved separation allows the fluid flow produced by a diesel engine to be contained and prevented from passing directly into the environment by way of a "blow-by tube."

A separator according to the present invention includes a separating deflector having at least one spiral accelerator extending about a spiral axis between a first and a second end. The spiral accelerator increases the velocity of the fluids of the fluid stream and directs these fluids away from the spiral axis toward non-absorbent beads that at least partially surround the accelerator and which allow a portion of the liquid to be directed into a containment area within the separator.

A separator according to another aspect of the present invention can include a special housing screen also extending at least partially about the spiral axis to create increased separation of the liquids from the gasses in the "blow-by" fluid stream.

In accordance with yet another aspect of the present invention, the separator can utilize an outer housing large enough to hold the amount of separated liquids produced by the "blow-by" between regularly scheduled oil changes. The separator can also include a drain apparatus designed to allow easy maintenance or draining of the collected fluids.

In accordance with yet a further aspect of the invention, the separator can include a pressure relief valve to prevent a failure of engine components due to a back pressure in the system. As a result, the pressure relief valve can be set at a nominal pressure designed to open at the first sign of back pressure.

In accordance with a further aspect of the invention, the separator can include a deflector assembly including both the spiral accelerator and the non-absorbent beads to allow easy removal of these components for periodic cleaning.

BRIEF DESCRIPTION OF THE DRAWINGS

The foregoing will in part be obvious and in part be pointed out more fully hereinafter in connection with a written description of preferred embodiments of the present invention illustrated in the accompanying drawings in which.

DESCRIPTION OF PREFERRED EMBODIMENTS

Figure 1A:
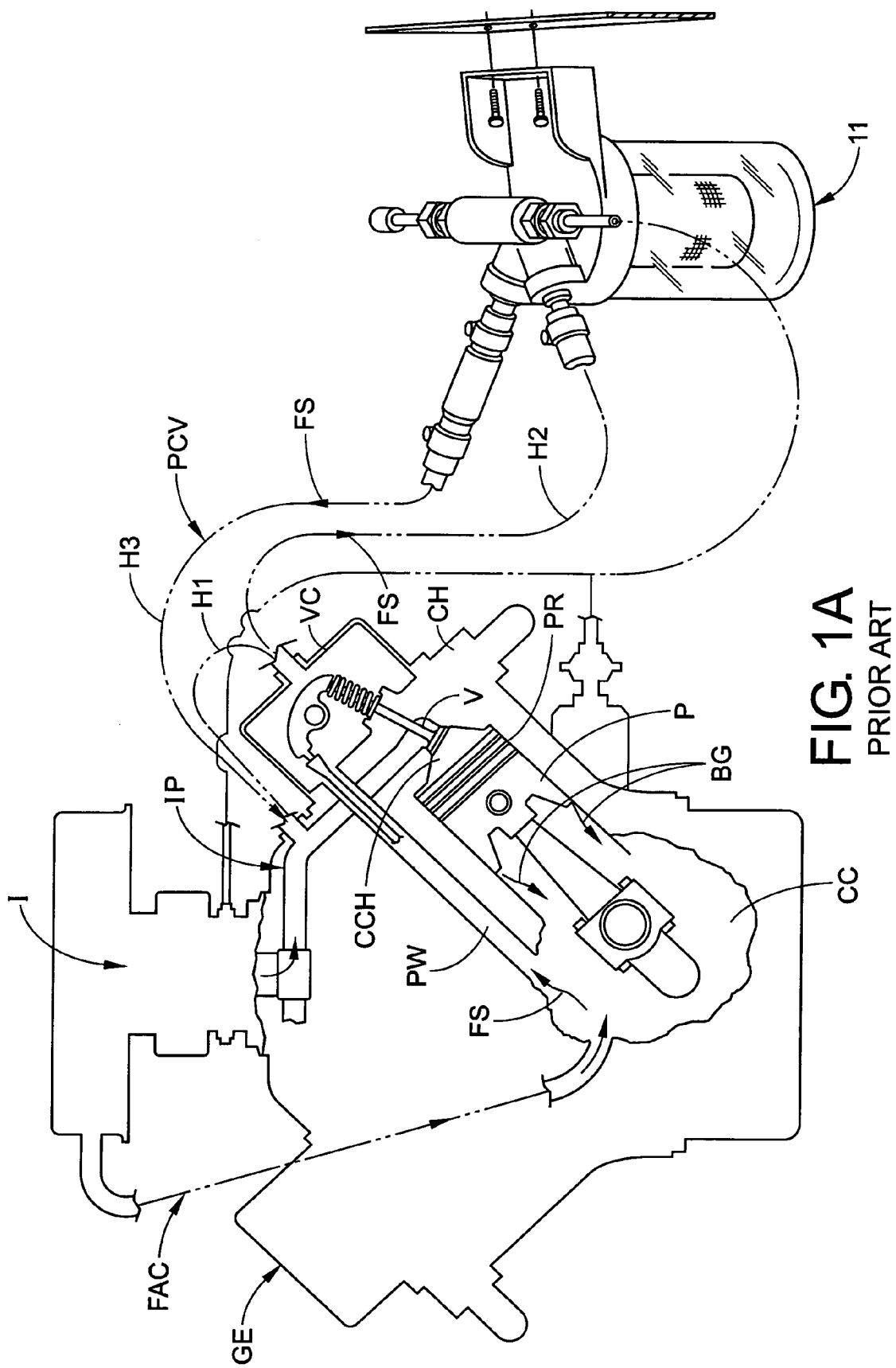
FIG. 1A is a prior art separator showing a typical PCV system for a gasolene engine.

Referring now in greater detail to the drawings wherein the showings are for the purpose of illustrating preferred embodiments of the invention only, and not for the purpose of limiting the invention, FIG. 1A illustrates a PCV system for a gasolene engine along with a prior art separator used in connection with the PCV system. More particularly, shown is a gasolene type internal combustion engine GE having a crankcase CC, an intake I and at least one cylinder head CH. In operation, intake I delivers a mixture of fuel and air through intake passageway IP into cylinder head CH which is directed to combustion chamber CCH. A valve V regulates the flow of the fuel-air mixture to the combustion chamber. Piston P then compresses the fuel-air mixture wherein during the compression process, a small portion, depending on the condition of the engine, passes by piston P as "blow-by" gasses BG into crankcase CC. In similar fashion, during the combustion of the fuel-air mixture, a portion of the exhaust gas also passes by piston P as "blow-by" gasses thereby entering crankcase CC. As a result, a positive pressure is produced in crankcase CC which must be released. However, the hot combustion gasses or "blow-by" gasses which pass the piston rings and enter the crankcase are homogenized with heavy crankcase oil due to the high speed churning action of the crank shaft and connecting rods.

The positive pressure in the crankcase creates a fluid stream FS, which includes crankcase oil, that passes through one of many passageways PW and enters the space between valve cover VC and cylinder head CH. This condition traps the fluid stream within the valve cover. In order to minimize the environmental effects of the fluid stream, a positive crankcase ventilation system PCV directs fluid stream FS from valve cover VC to an intake passageway IP by way of a hose H1. As a result, at least some of the gasses and liquids in fluid stream FS are burned during the combustion process of the engine. Since the fluid stream contains contaminated crankcase oils, heavier than normal carbon deposits on valves, spark plugs and pistons are created. In addition, fuel injectors can become clogged or partially clogged thereby hindering their operation. The portion of the fluid stream that makes it through the combustion cycle is expelled as soot through the exhaust system as particulate matter thereby coating the catalytic converter and reducing its capability to function properly. A portion of the particulate matter is expelled into the atmosphere. Essentially, the engines are choked by their own emissions which adversely affect performance, engine life and fuel economy.

Prior art devices have been used to remove some material from fluid stream FS by utilizing a device (Ref. #11) in the PCV system. As is shown in FIG. 1A, hoses H2 and H3 replace hose H1 to allow fluid stream FS to pass through device 11. However, these devices do not remove a substantial portion of the liquid and cannot be used to create a closed PCV system in connection with a diesel engine.

Figure 1B:
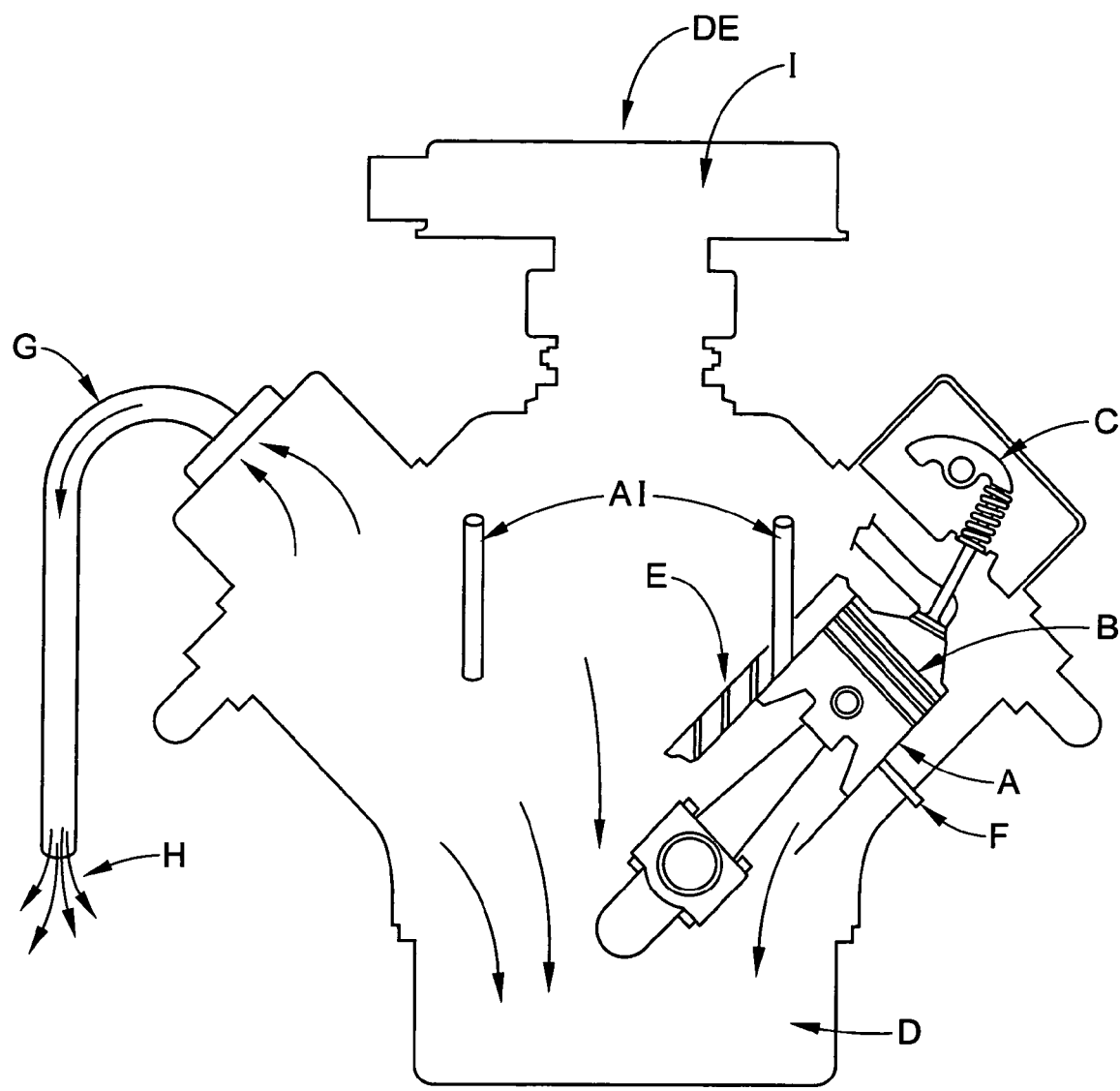
FIG. 1B is a prior art diesel engine with a "blow-by tube;"

Turning to FIG. 1B, shown is a prior art diesel engine DE which includes a "blow-by" tube G for relieving the internal pressure in the crankcase. Diesel engine DE has at least one piston A with rings B and has at least one head which houses rocker arms and valves C. Injectors direct the flow of the fuel into each of the cylinders for ignition. In operation, intake I delivers air to at least one cylinder at a time by way of inlet ports E. The fuel is delivered to the cylinder via injector F. The mixture of fuel and air is then compressed under extreme pressure causing ignition. With this ignition and compression, small amounts of unburned fuel vapor pass by the piston rings and is forced into the crankcase or oil pan D as "blow by" gases as discussed above. In similar fashion, after combustion of the fuel-air mixture, a portion of exhaust gas also passes by the piston rings as "blow-by" gases. As a result, a positive pressure is produced in the crankcase which must be released. However, the hot combustion gasses or "blow-by" gasses homogenize with heavy crankcase oil due the high speed churning action caused by the crankshaft and connecting rods. Nonetheless, this pressure must be relieved. As with the gasolene engine discussed above, a fluid flow is produced within the engine and is directed toward the spacing between the valve cover and the engine head. However, due to the liquids in the fluid flow, the fluid flow cannot be directed back to the induction system of the diesel engine. Instead, the fluid flow is released into the environment through a "blow-by" tube G.

Referring to FIGS. 2–13, shown is a separator 10 having an outer body or bottle 12, a deflector assembly 14 and a cap 20. Outer body 12 includes threaded neck portions 24 to threadingly receive cap assembly 20. Threaded neck portion 24 and cap 20 can also utilize a quarter turn thread design for easy removal or any other thread and/or cap locking design known in the art including, but not limited to lock down clamps. Cap 20 further includes an input fitting 30 and an output fitting 32. With reference to FIG. 1A, input fitting 30 can be connected to hose H2 and output fitting 30 can be connected to hose H3 such that fluid stream FS passes through separator 10 after it exits valve cover VC of the engine and before it enters intake passageway IP of the engine. With respect to diesel engines and which will be discussed in greater detail below, input fitting 30 can be connected to the "blow-by" tube and output fitting 32 can be connected to a hose in fluid connection with the induction system of the engine. The passage of fluid stream FS through separator 10 will also be discussed in greater detail below. Cap 20 can further include a mounting flange or bracket 40 which can be used by itself or in connection with other mounting arrangements to secure separator 10 to a surface on the vehicle including, but not limited to, a surface within the engine compartment of the vehicle such as the fire wall. In order to easily secure cap 20 to a surface, the bracket can include through holes 42 and 44 that can be used in connection with self-tapping screws or other fasteners known in the art.

Figure 4:
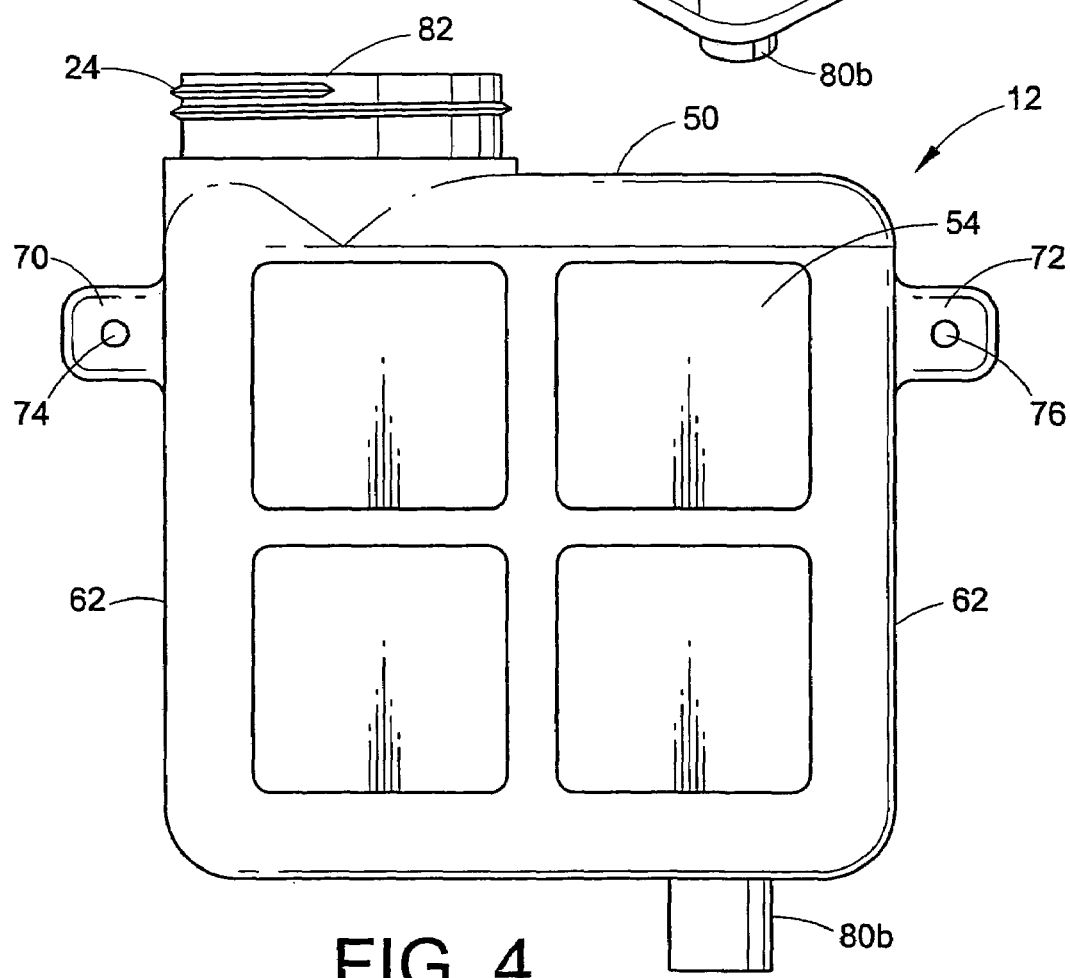
FIG. 4 is a front elevational view of the separator bottle housing shown in FIG. 3.
Figures 5, 6:
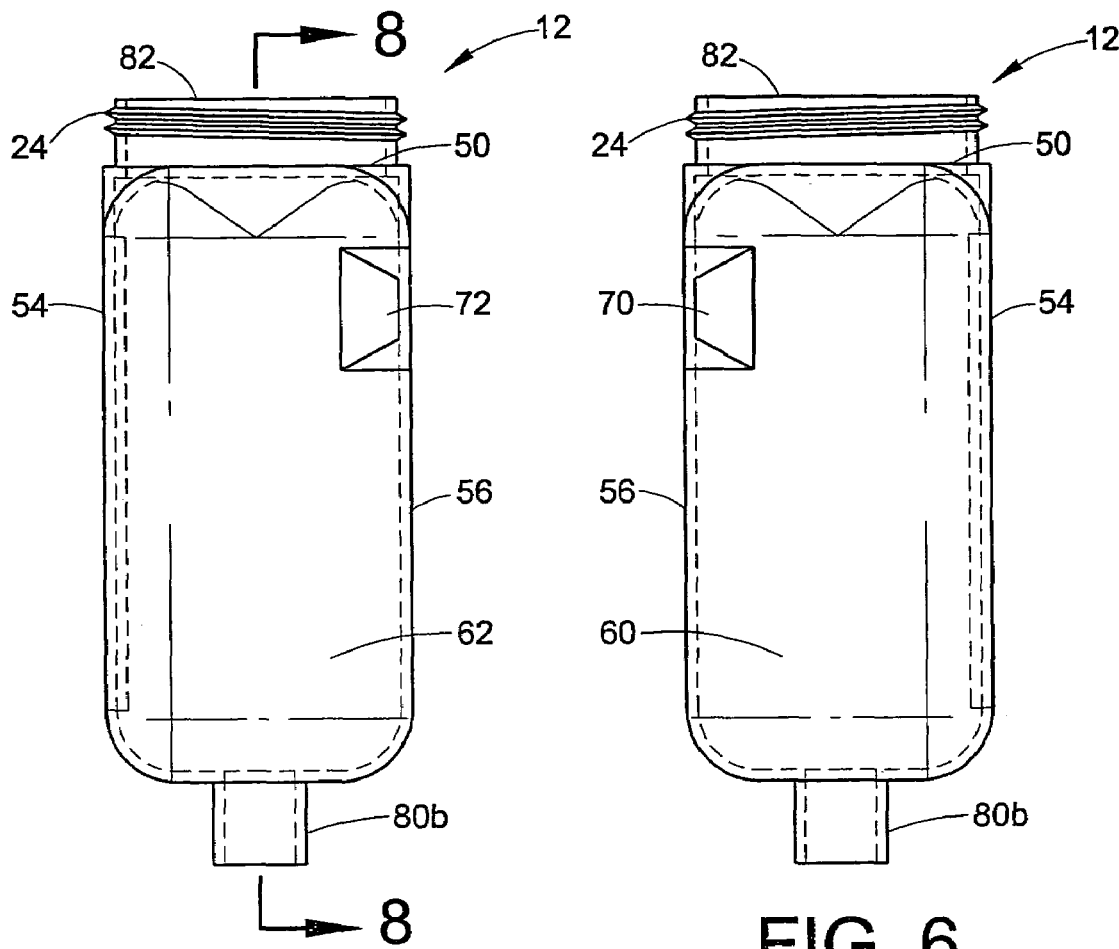
FIG. 5 is a right side elevational view of the separator bottle housing shown in FIG. 3.
FIG. 6 is a left side elevational view of the separator bottle housing shown in FIG. 3.
Figure 7:
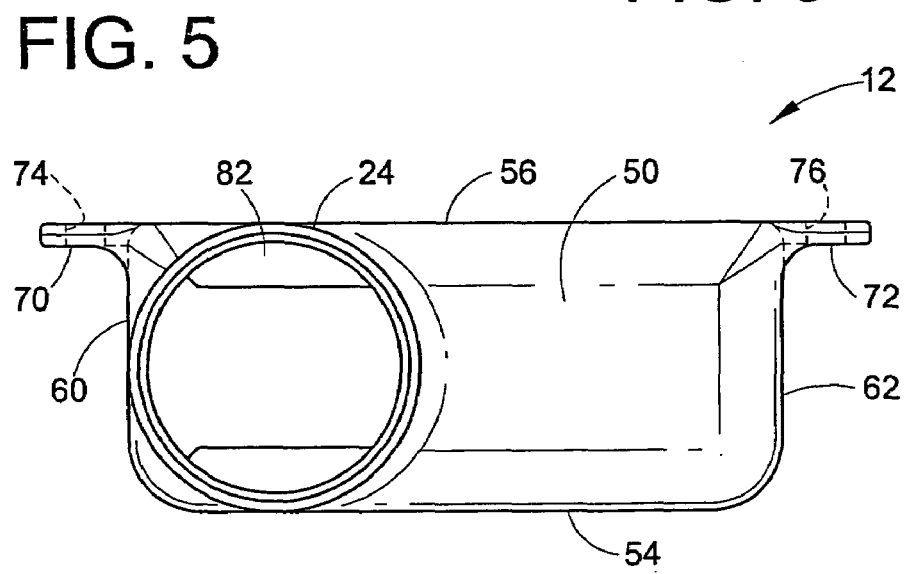
FIG. 7 is a top plan view of the separator housing shown in FIG. 3.

Bottle 12 has a top 50 and a bottom 52, a front 54 and a back 56 extending between top 50 and bottom 52. Bottle 12 further includes sides 60 and 62 and is shown in FIG. 4, sides 60 and 62 can include mounting flanges 70 and 72 respectively. As with cap bracket 40, mounting flanges 70 and 72 can include through holes 74 and 76, respectively, to mount separator 10 to a surface on the vehicle with self-tapping screws or other fasteners known in the art. Including both bracket 40 and flanges 70 and 72, allow separator 10 to be easily connected to a wide variety of surfaces.

As can be appreciated, cap assembly and bottle assembly can have many different configurations without detracting from the invention of this application. In this respect, bottle 12 can be shaped to fit within a particular engine compartment of any vehicle or vessel engine framing or compartment and yet be designed to hold a desired amount of liquid separated from the fluid stream. Also, the bottle or housing can also include strengthening ribs to strengthen the bottle while maintaining a desire weight of the bottle to cap ratio. Cap 20 and/or bottle 12 can further include internal strengthening ribs and can be made from any known material known in the art including molded plastics such as hi-heat composite molded plastic and metals.

Figure 2:
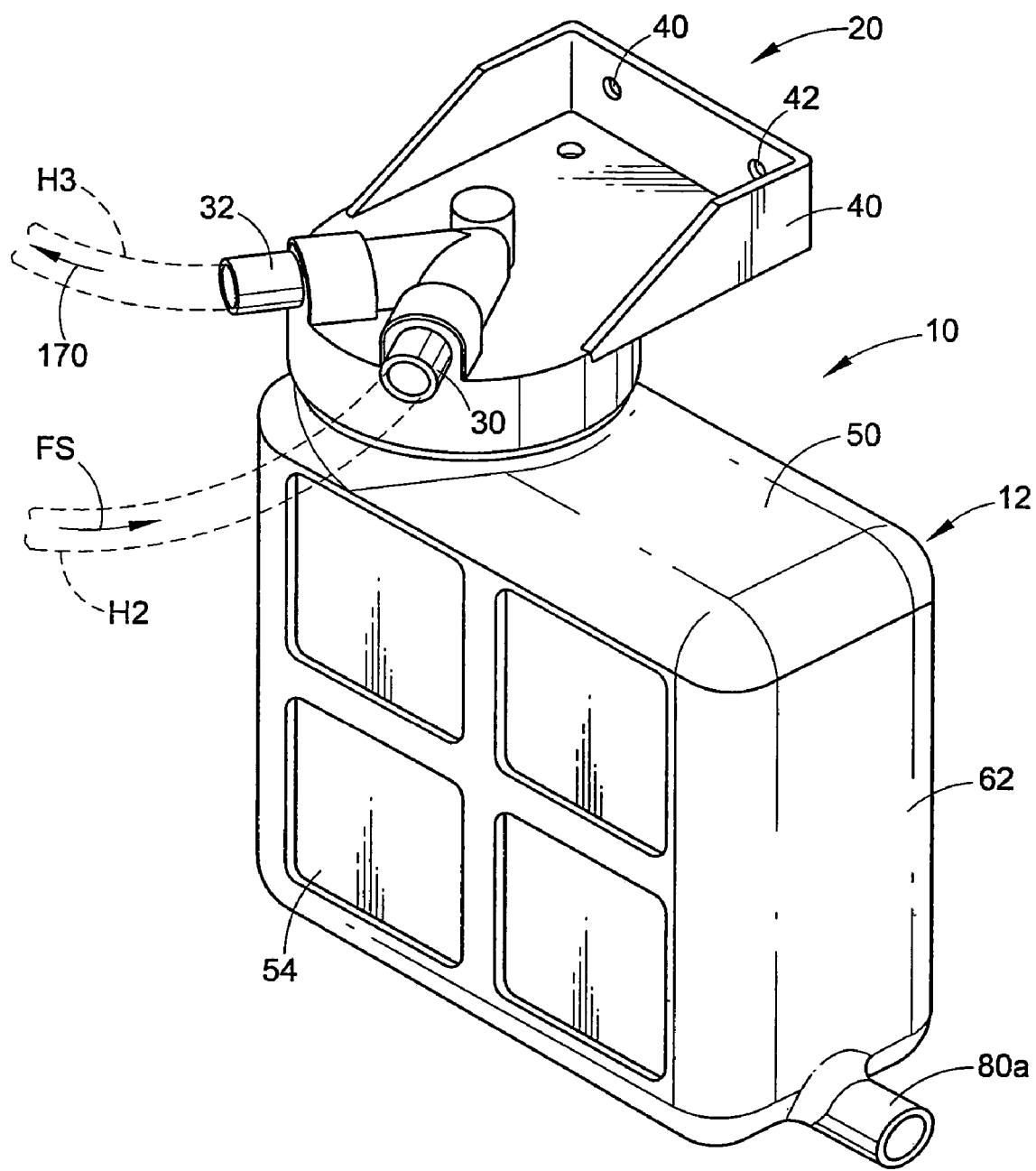
FIG. 2 is a front perspective view of a separator in accordance with the present invention.
Figure 3:
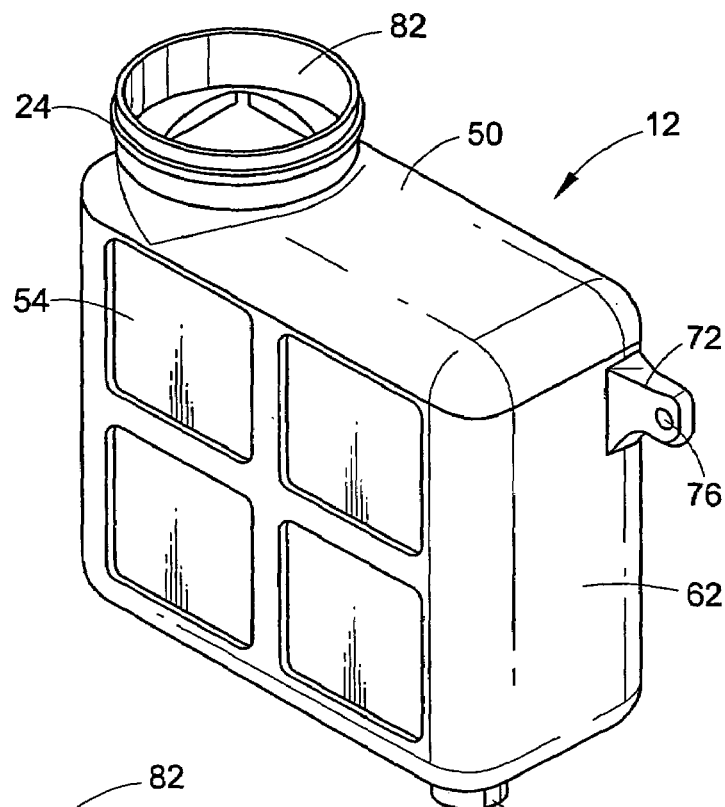
FIG. 3 is a perspective view of only a bottle housing of the separator shown in FIG. 2 with a different mounting configuration and drain configuration.
Figure 8:
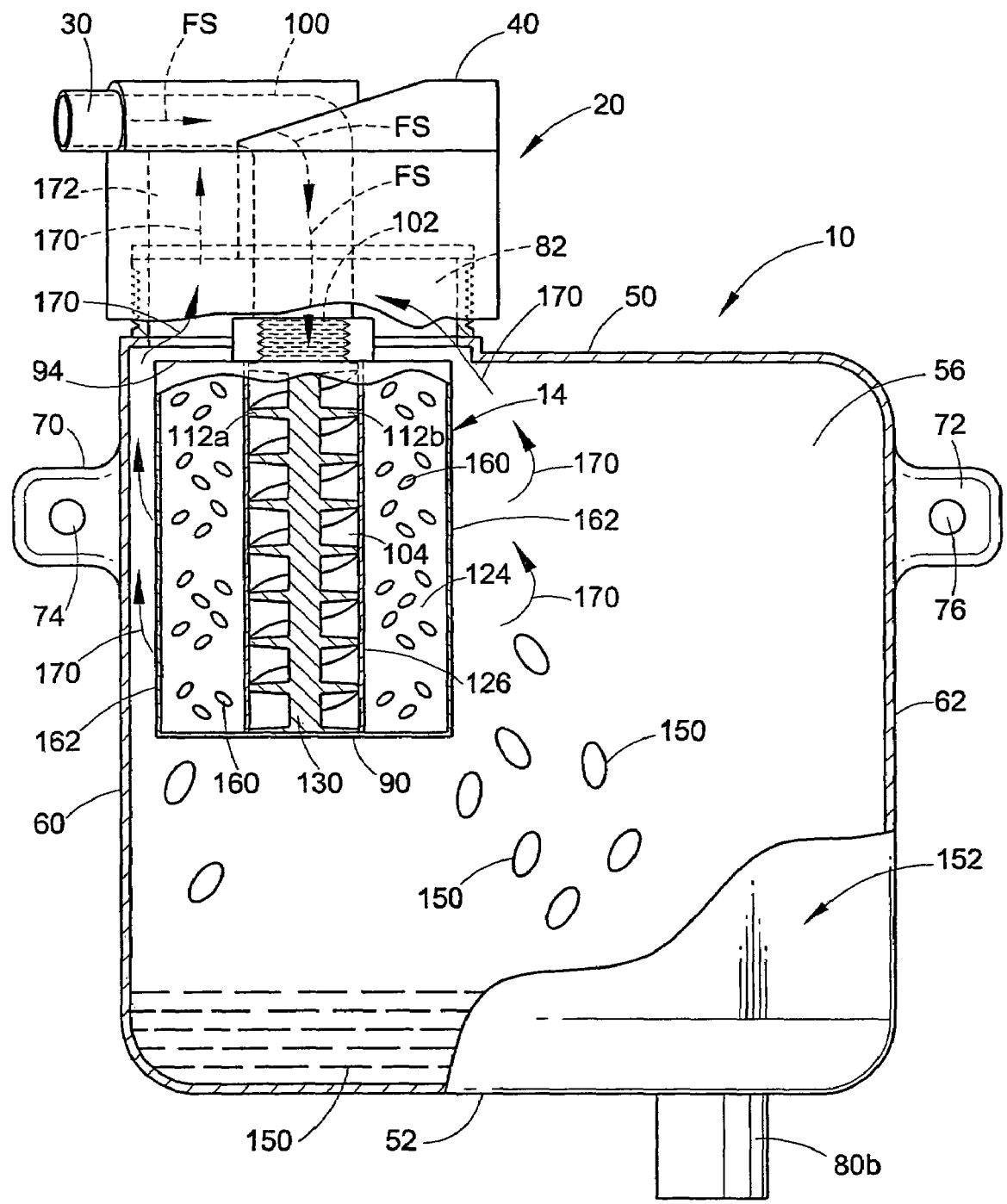
FIG. 8 is a sectional view of the separator according to the present invention.
Figure 9:
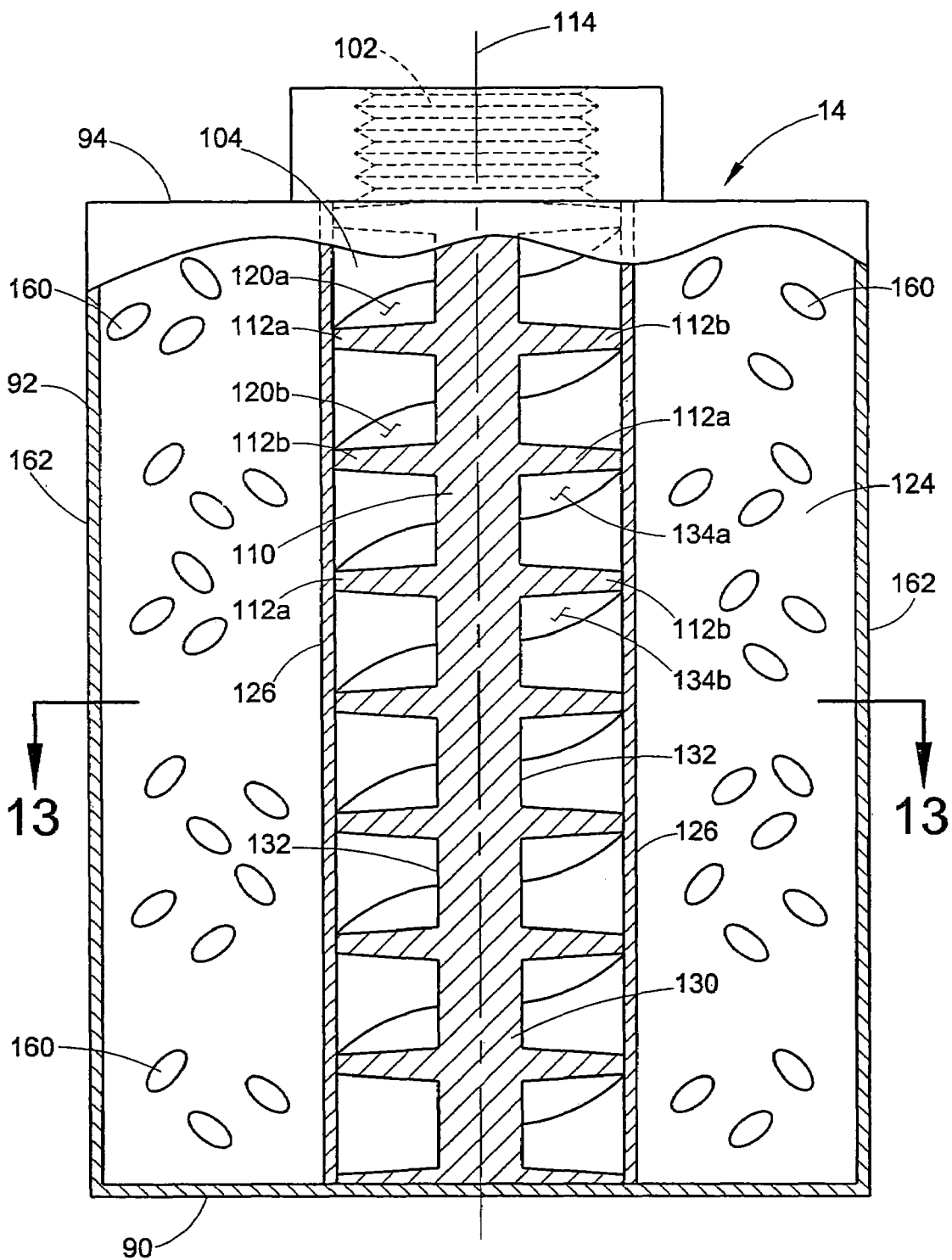
FIG. 9 is an enlarged sectional view of the deflector assembly shown in FIG. 8.
Figure 10:
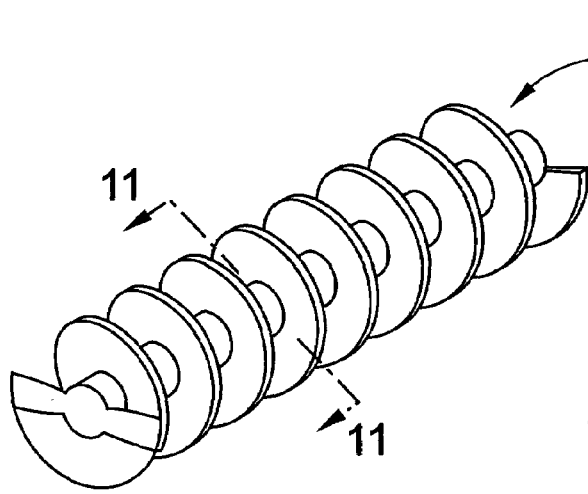
FIG. 10 is a perspective view of the spiral accelerator as is shown in FIG. 8.
Figure 11:
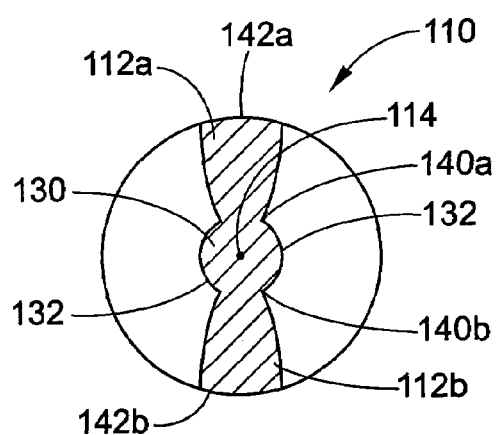
FIG. 11 is a sectional view taken along line 11—11 in FIG. 10.
Figure 12:
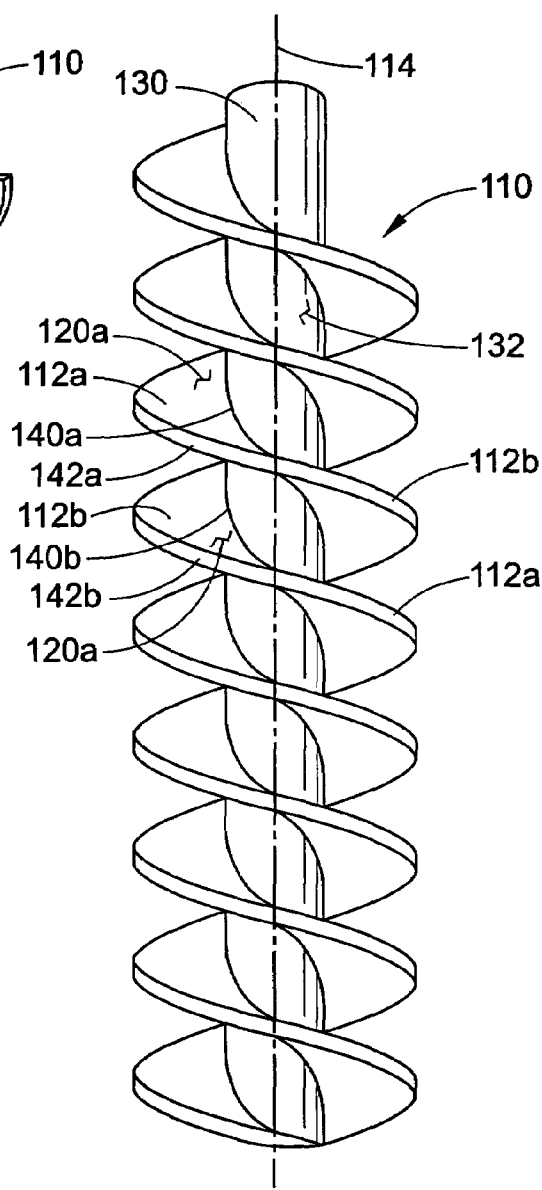
FIG. 12 is a front elevational view of the accelerator shown in FIG. 8.
Figure 13:
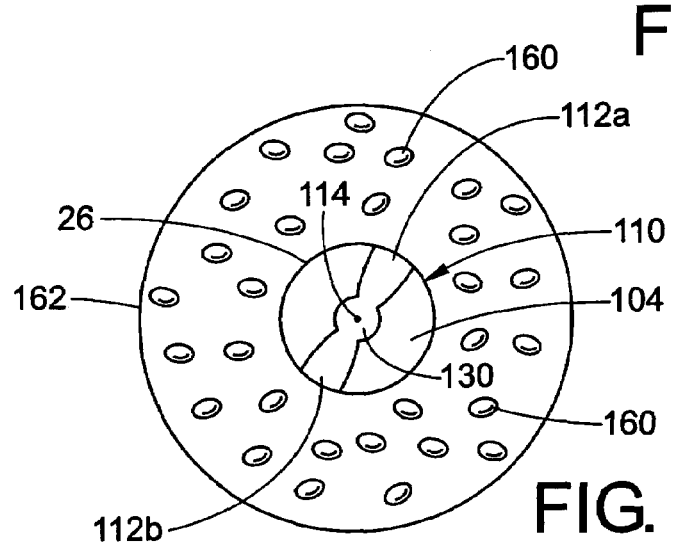
FIG. 13 is a sectional view taken along line 13—13 in FIG. 9.

Bottle 12 can further include a drain outlet 80 which should be positioned near the bottom of the container to drain the liquids collected from the fluid stream. As can be appreciated, bottles 12 that include a drain assembly can preferably be secured in place while bottles that do not include drain assemblies are preferably removable wherein only the cap is secured. Further, drain outlet 80 can be positioned virtually anywhere on the bottle assembly including extending horizontally from one of the sides, front, or back of bottle 12 such as from side 62 which is shown in FIG. 2 as 80a. Drain outlet can also extend downwardly from bottom 52 as is shown in FIG. 8 as 80b. Separator 10 can further include any known valve in the art (not shown) to open and close drain outlet 80. Also it should be noted that the drain and/or drain valve can be positioned on the bottle or located to fit any manufacturers structural design and can have the drain system configured as needed or as space requires. Furthermore, drain outlet 80 can also be fluidly connected with another bottle assembly (not shown) and/or a hose (also not shown) such that the liquids can be drained from the separator at a location spaced from the separator. For example, separator 10 can include a hose (not shown) connected to outlet 80 that extends towards the oil drain pan of the vehicle wherein a valve is positioned near the oil pan of the vehicle to allow convenient access for draining. With this particular configuration, the contaminants collected in the separator can be drained into the same container with the waste oil from the crankcase. Again, any known valve and/or hose assembly can be used to allow more convenient draining of the contaminated liquid from separator 10. A check valve can also be utilized to allow easy draining and cleaning of the separator.

Deflector assembly 14 is suspended within outer body 12 such that a bottom end 90 of the deflector assembly is spaced above bottom 52 of bottle 12. For example, deflector assembly 14 can threadingly engage cap assembly 20 such that deflector assembly 14 is suspended and/or supported by its engagement with cap assembly 20. However, other mounting arrangements known in the art could be utilized. In order to make cleaning easier for separator 10, deflector assembly 14 can be sized such that it can pass through a top opening 82 to allow removal and cleaning. More particularly, top opening 82 is shown to be a circular opening and deflector assembly 14 is cylindrical having bottom 90, a cylindrical side wall 92 and a circular top 94. The diameter of bottom 90, side wall 92 and top 94 are less than the diameter of top opening 82 thereby allowing the deflector assembly to pass through the opening. However, it should be noted that other configurations could be utilized in connection with deflector assembly 14 and/or opening 82.

In operation, fluid stream FS enter separator 10 by way of input fitting 30 of cap 20 and is directed toward deflector assembly 14 by a fluid channel 100 which can be molded into cap 14 or any other type of fluid channel known in the art. Once the fluid stream reaches assembly 14, it enters an opening 102 in top 94 of assembly 14 and is directed toward a first separation chamber 104. First separation chamber 104 can be cylindrical and extends between top 94 and bottom 90. First separation chamber 104 includes a separating deflector 110 which can have one or more spiral accelerators 112 that extend about a accelerator axis 114. Assembly 110 is shown to include two spiral accelerators 112a and 112b. However, it should be appreciated that while two accelerators are shown, more or less accelerators could be used without detracting from the invention of this application.

As fluid stream FS passes through first separation chamber 104, it engages surfaces 120a and 120b of spiral accelerators 112a and 112b, respectively, causing the fluid stream to spiral about axis 114 and to be driven outwardly from axis 114 toward a second separation chamber 124. First separating chamber 104 and second separating chamber 124 can be separated by a screen divider 126 which will be discussed in greater detail below. With special reference to FIGS. 10–12, deflector 110 includes a central core 130 essentially coaxial with axis 114 with an outer cylindrical surface 132. Accelerators 112a and 112b extend outwardly from surface 132 and include upwardly facing deflecting surfaces 120a and 120b, respectively, discussed above and downwardly facing surfaces 134a and 134b. Surfaces 120a and 120b extend from root edges 140a and 140b, respectively, to outer edges 142a and 142b. In similar fashion, surfaces 134a and 134b also extend between core 130 and outer edges 142a and 142b. Further, outer edges 142a and 142b can engage screen 126 to help maintain the position of deflector 110 within chamber 104. Accelerators 112a and 112b can also include arcuate surface accelerators 120a and 120b, respectively. In this respect, while surfaces 120a and 120b are curved based on their spiral about core 130, they can also be curved from root edges 140a and 140b to outer edges 142a and 142b, respectively.

The flow of the fluid stream is captured between surfaces 120a, 120b, 132, 134a, 134b and the entrance to second separation chamber 124, namely, screen 126 (if used) thereby forcing the fluid flow to enter chamber 124 as it travels through first chamber 104. Forcing the fluid stream through the spiral accelerator increases the speed of the fluid stream and cools the fluid stream before it enters second chamber 124. In addition, the spiral action of the fluid stream as it is driven through spiral accelerators 112a and 112b begins the separation process by having a different effect on the liquids than on the light hydrocarbons. In addition, the fluid stream is forced through screen 126 at the increased velocity which also has a separating effect. The separation process further takes place in second separation chamber 124 which also extends between bottom end 90 and top end 94 wherein the separated liquids 150 are directed downwardly toward a collection area 152 in body 12. As stated above, separation assembly is sufficiently spaced from bottom 52 to allow a desired amount of separated liquid to be maintained within body 12 without interfering with the operation of assembly 14.

Second chamber 124 includes non-absorbent or adsorption beads 160 which act to complete the separation process. In this respect, as the fluid stream enters chamber 124, its velocity has been increased based on the spiral action caused by accelerator 112. The fluid stream then impinges beads 160 and then based on its weight, is directed downwardly toward collection area 152. Beads 160 can be silica-gel beads or other adsorption or non-absorbent beads known in the art. Beads 160 are maintained in chamber 124 by a divider 126 that can be a screen and an outer barrier 162 that can also be a screen in addition to assembly bottom 90 and top 94. The volume of beads 160 utilized in chamber 124 is a function of several factors including the internal combustion engine in which separator 10 is used and the operating conditions of the vehicle and/or the size of the chambers.

As the fluid stream passes through the chambers, separated liquid 150 is directed downwardly toward collection area 152 and the light hydrocarbons and other gasses 170 are drawn upwardly and out of the separator by the vacuum created in the air intake system of the engine. This vacuum relieves or balances the pressure built up from the "blow-by" gasses in the engine. A gas stream 170 exits body 12 by flowing through a fluid channel 172 in cap assembly 20 and exits separator 10 at outlet fitting 32. Gas stream 170 is then directed to induction passageway IP by hose H3. Once the gas stream enters the induction system of the internal combustion engine, it is directed to the combustion chamber and is mixed with the new fuel and air wherein the hydrocarbons in stream 170 become a booster to the fuel mixture. Since a greater percentage of liquid (mainly contaminated crankcase oil) is removed from the fluid stream, the introduction of gas stream 170 into the induction system of the engine can be a benefit to the combustion of the fuel-air mixture instead of merely a means to burn off the fluid stream produced by the "blow-by" gasses. In this respect, the "blow-by" gasses which are separated from the contaminated oil are a booster which aid in a better more complete burn during combustion. Further, once the separated "blow-by" gasses reach the compression chamber they are already at engine temperature which creates a better mixture and a more complete burn.

Figure 14:
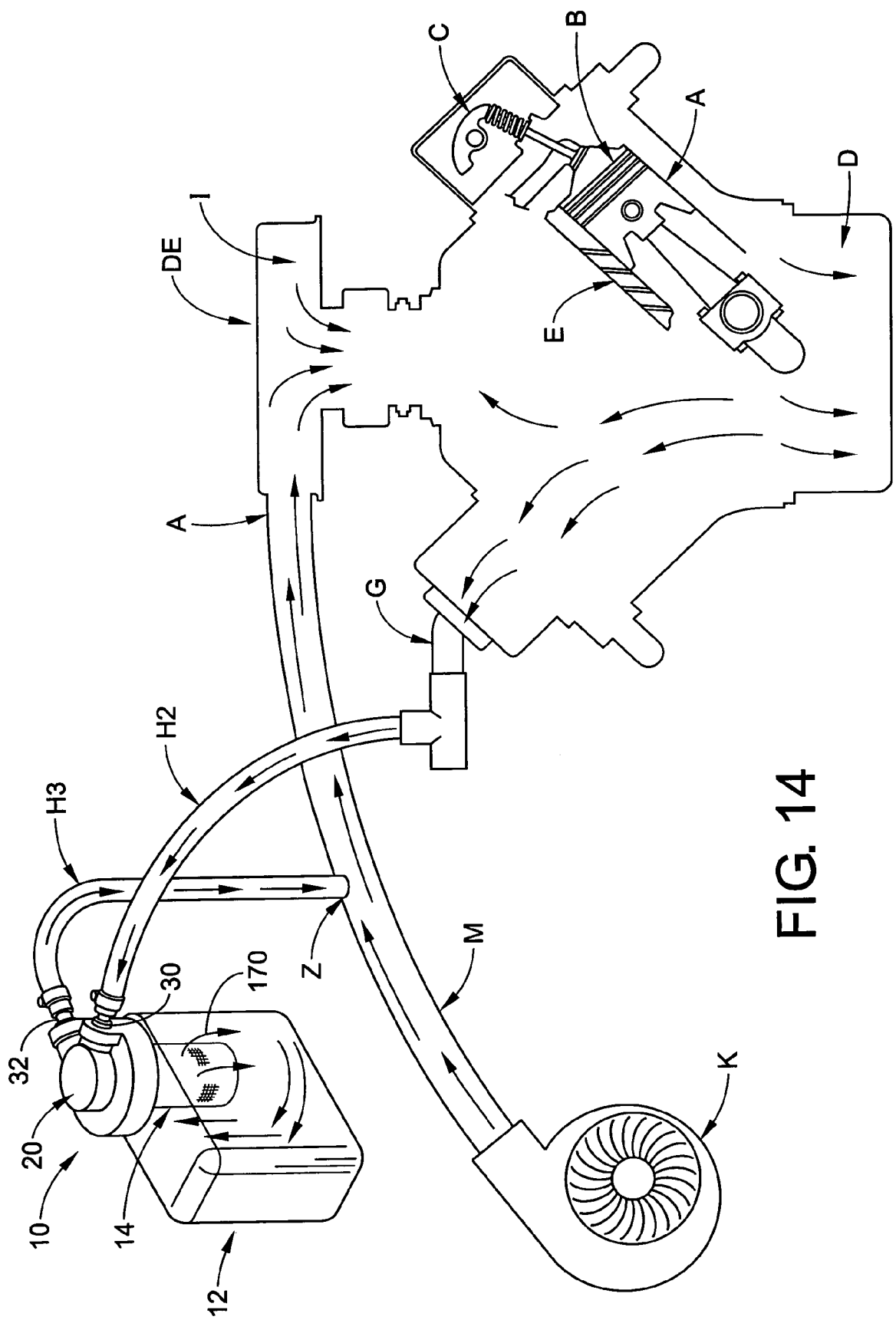
FIG. 14 is a diesel engine which includes a separator according to the present invention.

Turning to FIG. 14, shown is separator 10 connected to diesel engine DE. More particularly, as is stated above, diesel engine DE includes an intake I which directs the flow of air towards the compression chamber of the diesel engine by way of air inlets E. This particular diesel engine is turbo-charged including turbo-charger K that is known in the art and which is in fluid connection with induction system I by way of intake line M. Blow-by tube G has been joined to inlet fitting 30 by way of hose H2. The out flowing gases 170 are directed to intake line M by hose H3 connected between outlet connector 32 and a fitting Z in inlet line M. In operation, air is driven through turbo-charger K and is directed to the combustion chamber by way of intake system I. In the combustion chamber, the air is mixed with a fuel mixture which is compressed and ignited to drive the engine. The blow-by gasses which pass by piston rings B and enter the crankcase are directed toward the cylinder head and exit the engine at blow-by tube G. However, since blow-by tube G is in fluid connection with inlet 30, the fluid stream exiting the engine is directed to separator 10 and passes through the separator whereby the liquids in the fluid stream are collected and contained in bottle 12 while the lighter hydrocarbons exit separator 10 at outlet 32. These lighter hydrocarbons pass through hose H3 and are directed to intake line M wherein they are reintroduced into diesel engine DE by way of the induction systems. While prior art separating systems could not be used in connection with a diesel engine, separator 10 removes enough of the liquids contained in the fluid stream to allow the use of a closed loop system with a diesel engine. Furthermore, as stated above, such a high amount of liquids are removed from the fluid stream that the light hydrocarbons reintroduced into the engine actually produce performance gains and reduce unwanted engine deposits thereby increasing power, increasing fuel economy, and increasing engine life.

The invention of this application is designed to have multiple benefits for an internal combustion engine. In this respect, the use of a separator according to the present invention increases engine performance by efficiently burning the lighter hydrocarbons which blow-by the piston ring during compression and the exhaust cycle which increases fuel economy and engine performance. However, a greater benefit of the separator according to the present invention relates to the ability of creating a closed loop system for the blow-by gasses of a diesel engine thereby reducing the pollutants emitted by the diesel engine.

While considerable emphasis has been placed on the preferred embodiments of the invention illustrated and described herein, it will be appreciated that other embodiments can be made and that many changes can be made in the preferred embodiments without departing from the principles of the invention. It is intended to include all such modifications and alterations insofar as they come within the scope of the appended claims or the equivalents thereof.

What is claimed is:

1. A separator for separating liquids in a fluid stream generated by blow-by gasses produced in a crankcase of an internal combustion engine, the fluid stream including both gasses and liquids, said separator comprising:
   an inlet in fluid connection with the engine for receiving the fluid stream and an outlet in fluid connection with the engine to return a gas stream to the engine;
   a fluid path fluidly connecting said inlet to said outlet;
   a containment vessel in fluid connection with said fluid path having a fluid containment region;
   a spiral fluid stream accelerator in said fluid path that extends about a spiral axis, said spiral accelerator accelerating said fluid stream radially outwardly from said spiral axis to at least partially separate the gasses from the liquids in the fluid stream; and,
   a deflector in said fluid path between said accelerator and said outlet to change the direction of said liquid to direct at least part of the liquids in the fluid stream into said fluid containment region and said gas stream to said outlet.

2. The separator of claim 1, wherein said fluid stream accelerator and said deflector are fully encapsulated within said containment vessel.

3. The separator of claim 2, wherein said fluid stream accelerator and said deflector form a portion of a deflector assembly that is selectably interengageable with said containment vessel as an assembled unit and removable from said containment vessel as an assembled unit.

4. A separator for separating liquids in a fluid stream generated by blow-by gasses produced in a crankcase of an internal combustion engine, the fluid stream including both gasses and liquids, said separator comprising:
   an inlet in fluid connection with the engine for receiving the fluid stream and an outlet in fluid connection with the engine to return a gas stream to the engine;
   a fluid path fluidly connecting said inlet to said outlet;
   a containment vessel in fluid connection with said fluid path having a fluid containment region;
   a fluid stream accelerator in said fluid path, said accelerator accelerating said fluid stream to at least partially separate the gasses from the liquids in the fluid stream;
   a deflector in said fluid path between said accelerator and said outlet to change the direction of said liquid to direct at least part of the liquids in the fluid stream into said fluid containment region and said gas stream to said outlet; and,
   said fluid stream accelerator and said deflector being fully encapsulated within said containment vessel and form a portion of a deflector assembly that is separate from said containment vessel and selectable interengageable with said containment vessel as an unified assembled unit and removable from said containment vessel as an assembled unit, said deflector assembly further includes said inlet and said outlet for said separator.

5. A separator for separating liquids in a fluid stream generated by blow-by gasses produced in a crankcase of an internal combustion engine, the fluid stream including both gasses and liquids, said separator comprising:
   an inlet in fluid connection with the engine for receiving the fluid stream and an outlet in fluid connection with the engine to return a gas stream to the engine;
   a fluid path fluidly connecting said inlet to said outlet;
   a containment vessel in fluid connection with said fluid path having a fluid containment region;
   a fluid stream accelerator in said fluid path, said accelerator accelerating said fluid stream to at least partially separate the gasses from the liquids in the fluid stream;
   a deflector in said fluid path between said accelerator and said outlet to change the direction of said liquid to direct at least part of the liquids in the fluid stream into said fluid containment region and said gas stream to said outlet; said fluid stream accelerator and said deflector being fully encapsulated within said containment vessel and form a portion of a deflector assembly that is selectable interengageable with said containment vessel; said deflector assembly further includes said inlet and said outlet and said deflector assembly further includes a hanger member to support said separator on an object while allowing said containment vessel to be detachable.

6. A separator for separating liquids in a fluid stream generated by blow-by gasses produced in a crankcase of an internal combustion engine, the fluid stream including both gasses and liquids, said separator comprising:
   an inlet in fluid connection with the engine for receiving the fluid stream and an outlet in fluid connection with the engine to return a gas stream to the engine;
   a fluid path fluidly connecting said inlet to said outlet;
   a containment vessel in fluid connection with said fluid path having a fluid containment region;
   a fluid stream accelerator in said fluid path, said accelerator accelerating said fluid stream to at least partially separate the gasses from the liquids in the fluid stream; and,
   a deflector in said fluid path between said accelerator and said outlet to change the direction of said liquid to direct at least part of the liquids in the fluid stream into said fluid containment region and said gas stream to said outlet, said fluid stream accelerator includes a spiral fluid passageway in said fluid path, said spiral passageway including at least one elongated spiral member extending about a spiral axis between a first end and a second end and further includes an outer radial opening at least partially defined by said at least one spiral member, said fluid stream entering said spiral passageway near said first end and being forced toward said second end wherein said fluid stream is accelerated radially outwardly from said axis and passes through said radial opening.

7. The separator of claim 6, wherein said deflector is coaxial to said axis.

8. The separator of claim 7, wherein said deflector includes non-absorbent or adsorption beads.

9. The separator of claim 6, wherein said deflector includes non-absorbent or adsorption beads that at least partially surround said accelerator.

10. The separator of claim 9, further including a screen separating said accelerator from said deflector.

11. The separator of claim 6, wherein said fluid stream accelerator includes an end wall near said second end.

12. The separator of claim 11, wherein said deflector partially surrounds said accelerator and extends from near said first end to near said second end such that said deflector has a deflector end near said second end, said end wall substantially covering said deflector end.

13. The separator of claim 12, wherein said deflector is coaxial to said axis.

14. The separator of claim 13, wherein said fluid stream accelerator and said deflector form a portion of a cylindrical deflector assembly that is selectably interengageable with said containment vessel.

15. The separator of claim 1, wherein said containment vessel includes a drain in said fluid containment region.

16. The separator of claim 15, wherein said drain includes a drain valve.

17. The separator of claim 16, wherein said drain valve is spaced from said vessel.

18. A separator for separating liquids in a fluid stream generated by blow-by gasses produced in a crankcase of an internal combustion engine, the fluid stream including both gasses and liquids, said separator comprising:

an inlet in fluid connection with the engine for receiving the fluid stream and an outlet in fluid connection with the engine to return a gas stream to the engine;

a fluid path fluidly connecting said inlet to said outlet;

a containment vessel in fluid connection with said fluid path;

a spiral fluid passageway in said fluid path, said spiral passageway including at least one elongated spiral member extending about a spiral axis between a first end and a second end and further includes an outer radial opening at least partially defined by said at least one spiral member, said fluid stream entering said spiral passageway near said first end and being forced toward said second end wherein said fluid stream is accelerated radially outwardly from said axis and passes through said radial opening;

a deflector in said fluid path and radially outwardly of said passageway, said deflector being coaxial to said axis; and, a porous layer between said passageway and said deflector.

19. The separator of claim 18, wherein said at least one spiral member is at least two spiral members.

20. The separator of claim 18, wherein said deflector includes non-absorbent or adsorption beads and said porous layer includes a screen.

\* \* \* \* \*